United States Patent [19]

Kunert et al.

[11] Patent Number: 5,309,677
[45] Date of Patent: May 10, 1994

[54] ELECTRICALLY OPERATED VEHICLE WINDOW

[75] Inventors: Heinz Kunert, Cologne; Hans Ohlenforst, Aachen, both of Fed. Rep. of Germany

[73] Assignee: Saint Gobain Vitrage International, Courbevoie, France

[21] Appl. No.: 82,330

[22] Filed: Jun. 24, 1993

Related U.S. Application Data

[63] Continuation of Ser. No. 781,474, Oct. 23, 1991, abandoned.

[30] Foreign Application Priority Data

Oct. 25, 1990 [DE] Fed. Rep. of Germany ....... 4033949

[51] Int. Cl.$^5$ ............................................. E05F 15/08
[52] U.S. Cl. ......................................... 49/349; 49/350; 49/362
[58] Field of Search ................... 49/348, 349, 350, 139, 49/362, 358

[56] References Cited

U.S. PATENT DOCUMENTS

| | | | |
|---|---|---|---|
| 1,500,765 | 7/1924 | Norwood et al. | 49/349 |
| 3,544,822 | 12/1970 | Pickles . | |
| 3,706,163 | 12/1972 | Pickles | 49/348 X |
| 4,182,078 | 1/1980 | Bartholomew | 49/362 X |
| 4,389,818 | 6/1983 | Sakamoto | 49/349 |
| 4,905,413 | 3/1990 | Kuki et al. | 49/348 X |
| 4,908,988 | 3/1990 | Yamamura et al. | 49/349 X |
| 4,939,867 | 7/1990 | Harada et al. | 49/358 X |
| 4,967,510 | 11/1990 | Torii et al. | 49/349 X |
| 4,970,827 | 11/1990 | Djordjevie | 49/358 X |
| 4,991,348 | 2/1991 | Yamamura et al. | 49/349 |
| 5,012,613 | 5/1991 | Sekine . | |

FOREIGN PATENT DOCUMENTS

| | | | |
|---|---|---|---|
| 4005759 | 8/1991 | Fed. Rep. of Germany | E05F 15/16 |
| 4008061 | 9/1991 | Fed. Rep. of Germany | E05F 11/41 |
| 199421 | 6/1923 | United Kingdom | 49/350 |
| 1517446 | 7/1978 | United Kingdom . | |

*Primary Examiner*—Peter M. Cuomo
*Assistant Examiner*—Jerry Redman
*Attorney, Agent, or Firm*—Pennie & Edmonds

[57] ABSTRACT

An electric motor driven vehicle window assembly wherein an electric motor is mounted in an aperture formed in a portion of a transparent window pane. The electric motor operates in conjunction with a simple transmission element such as a threaded rod or a toothed rack and when energized, causes the window to be raised or lowered. The invention provides a motor driven window which is more compact than conventional motor driven vehicle windows.

13 Claims, 5 Drawing Sheets

ELECTRICALLY OPERATED VEHICLE WINDOW

This is a continuation of application Ser. No. 07/781,474, filed Oct. 23, 1991, now abandoned.

BACKGROUND OF THE INVENTION

Conventional electric motor-operated windows of vehicles, especially automobile door windows that have ascending and descending panes, commonly have the drive motor mounted inside the wall or the box-casing of the door. The motor drive force is transmitted to the window pane by shafts, connecting rods, levers or cables. The motor force usually acts on the window pane through a device which is clamped on the lower edge of the window pane, thereby causing the pane to move in its guides. Alternatively, the device may be mounted upon a lower portion of the pane by means of one or more bolts passing through holes in the pane.

It is already known from U.S. Pat. No. 5,012,613 to design a motor-driven window mechanism in such a way that the electric motor is fixed to the pane, and therefore moves with it in both directions, while cooperating with a shaft mounted inside the door casing. In such devices, the motor may be mounted directly on the pane. This arrangement requires that considerable space be reserved inside the wall or door casing to allow the motor to move freely in the directions of travel. It is also necessary to provide means and, if applicable, complementary holes through the door casing, to provide access to the motor for repairs.

U.S. Pat. No. 4,389,818 also describes a motor-driven automobile window wherein an electric motor is mounted on a support projecting downwards beyond the edge of the pane. Alternatively, the motor can be placed along the edge of the window pane. However, each of these mounting methods requires additional supports which necessarily result in further manufacturing difficulty and expense.

SUMMARY OF THE INVENTION

The present invention simplifies the mounting of a motor for operating motorized vehicle windows and the method by which the forces of the motor are transmitted to a window pane. This is achieved by disposing the motor in an aperture formed within the body of the glass pane. This arrangement allows the overall space requirements within the vehicle wall or door for the motor driven window to be reduced, because a considerable portion of the motor is situated within the pane. Furthermore, the arrangement according to the present invention allows the motor to be mounted simply, reliably and durably. A vehicle window according to this invention also has the advantage of being guided and directed as it descends into the door frame, without the need for slides at the sides of the window opening.

Several alternative embodiments of the present invention are possible. One alternative involves the installation of rotary electric motors in the form of flat discs, the rotor of which has a shaft carrying a pinion. The shaft connects the motor with a transmission element installed in the wall of the vehicle or the casing of the door. The transmission element may be mounted parallel to the plane of the pane. This element may be a toothed rack or a threaded shaft cooperating with a driven nut mounted on the housing of the motor.

In a second alternative embodiment, the motor includes a rotor, the hub of which includes an internal threaded surface for engaging a threaded shaft.

In a third alternative embodiment of the present invention, the rotary motor may be replaced by a linear motor cooperating with a conductor rail. The rail, which is preferably made of copper, can be mounted within the vehicle wall of the door casing.

BRIEF DESCRIPTION OF THE DRAWINGS

These and other objects, features and advantages of the invention will be more readily apparent from the following detailed description of the preferred embodiments of the invention in which.

DETAILED DESCRIPTION

Figure 1:
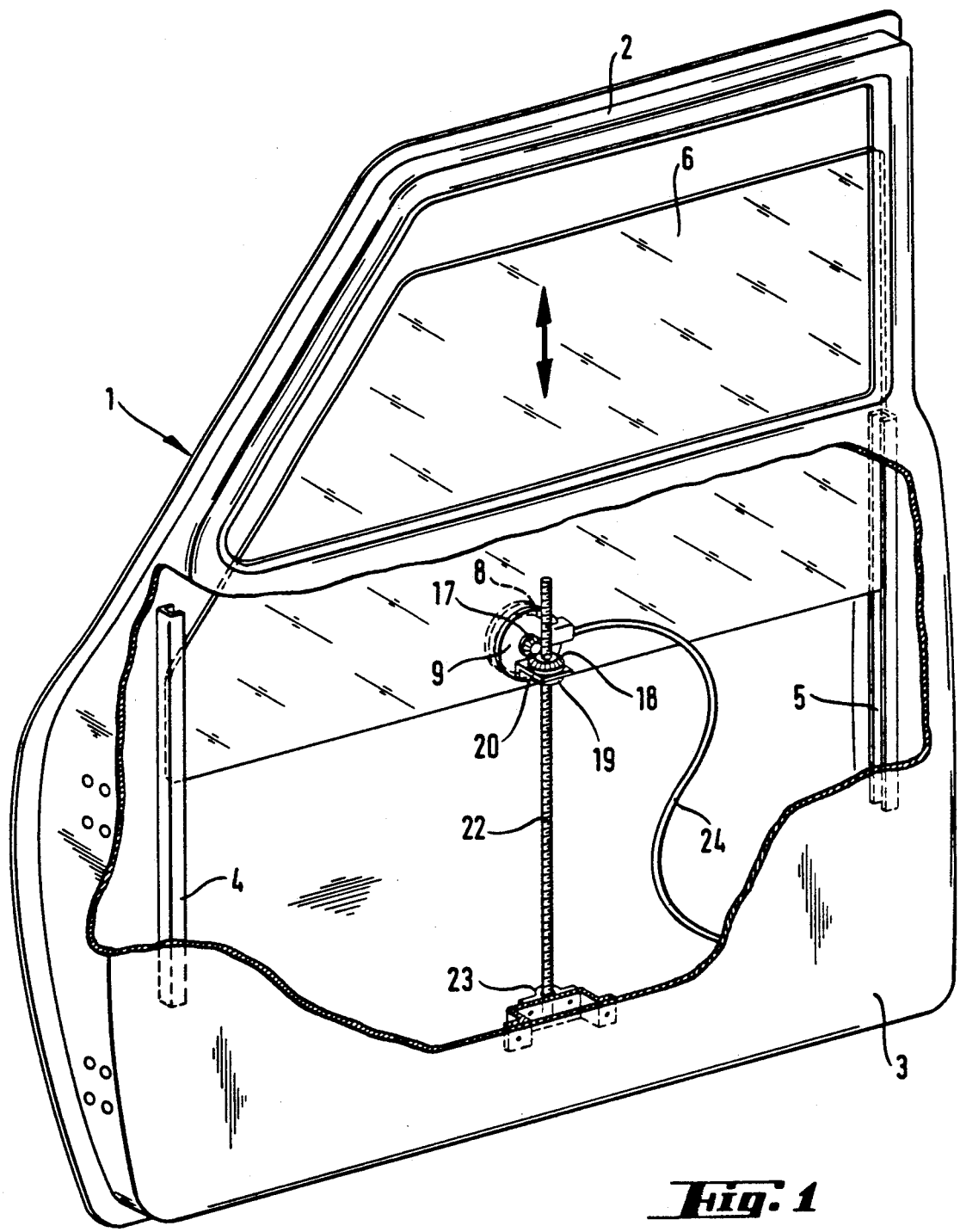
FIG. 1 is a perspective view of a door of a vehicle equipped with a motor driven window pane according to this invention.

FIG. 1 comprises vehicle door 1, an upper part 2 framing the window opening and a lower part 3 constituting the casing of a door. In the casing there are mounted, at the sides, slides 4 and 5, on which the pane 6 slides vertically.

An opening 8 is formed in the pane 6, in the vicinity of the lower edge of the pane. The shape and dimensions of this opening are adapted to those of the electric motor 9, which is inserted into the opening. The opening 8 may be formed in the desired shape by means of known cutting machines, using high-pressure water jets charged with abrasive. This cutting is performed before the thermal hardening of the pane. Thermal hardening involves heating the glass to a specific temperature and then abruptly cooling it.

Figure 2:
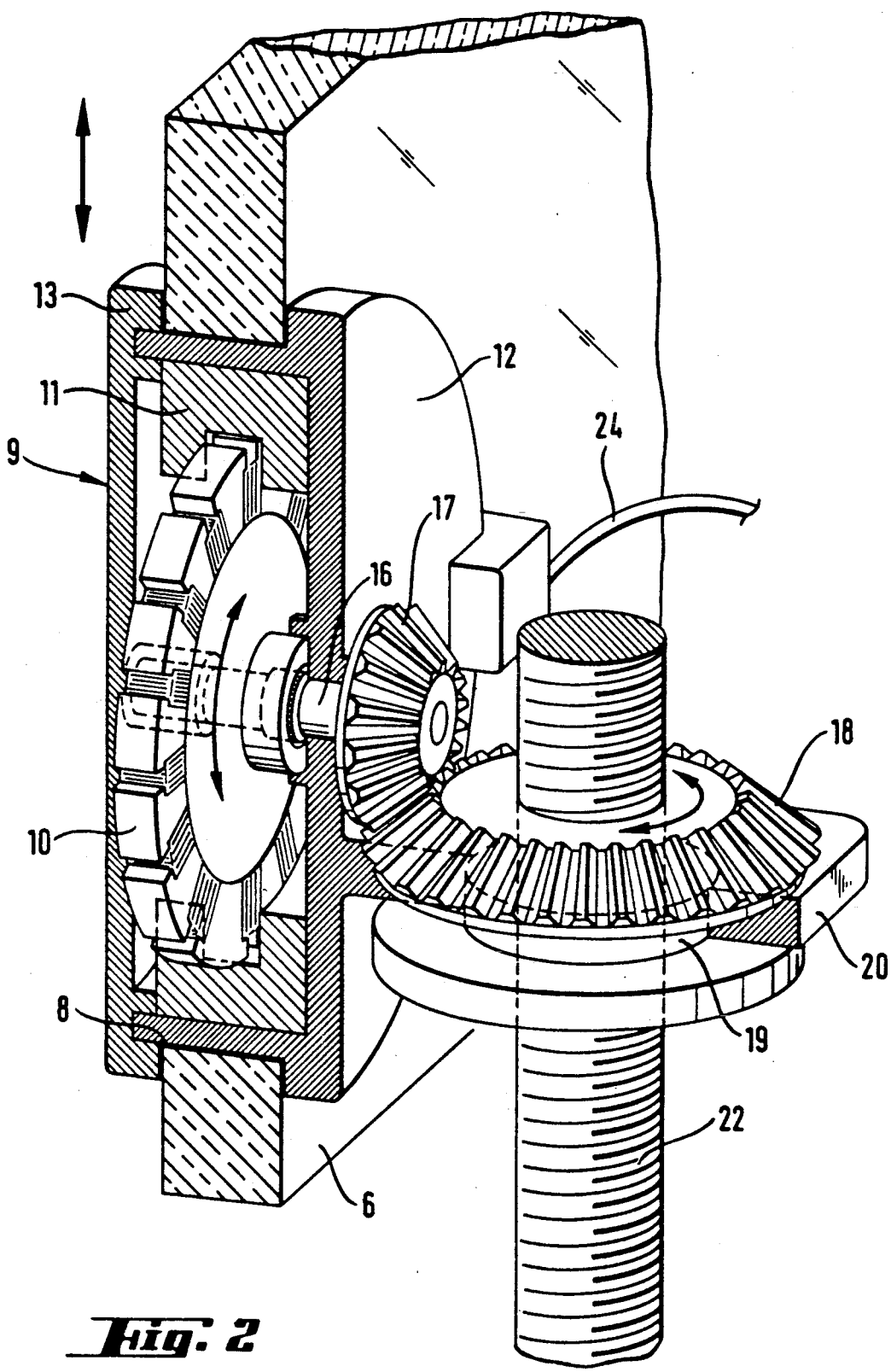
FIG. 2 is an enlarged detail, in partial cross-section, of the motor drive shown in FIG. 1.

The electric motor 9 is of especially flat construction, and in particular is a revolving disc motor, as shown schematically in FIG. 2. The rotor has the form of a flat disc 10, which cooperates with the stator winding 11, or again with permanent magnets. Revolving disc motors suitable for mounting in this way, are commercially available. The motor casing has a front part 12 and a back part 13 designed in such a way that they allow the motor to be placed in the aperture 8 of the pane 6 by tightening the two parts together after positioning on the pane.

On the rotor shaft 16 there is mounted a bevel gear 17 which engages a bevel gear wheel 18. If necessary, a reduction gear train, not shown here, may be interposed between the shaft 16 and bevel gear 17. Bevel gear wheel 18 is part of a nut 19 which is mounted so as to be freely rotatable on a bracket plate 20 fixed to the front part 12 of the casing. The internal thread of the nut 19 cooperates with the thread of a shaft 22, disposed in a substantially vertical direction inside the door casing 3, on which a mounting device 23 holds the shaft at its lower part. A flexible cable 24 supplies electricity to the motor 9, which when energized, causes the pane to slide in the desired direction by displacement of the nut 19 along the shaft 22.

Figure 3:
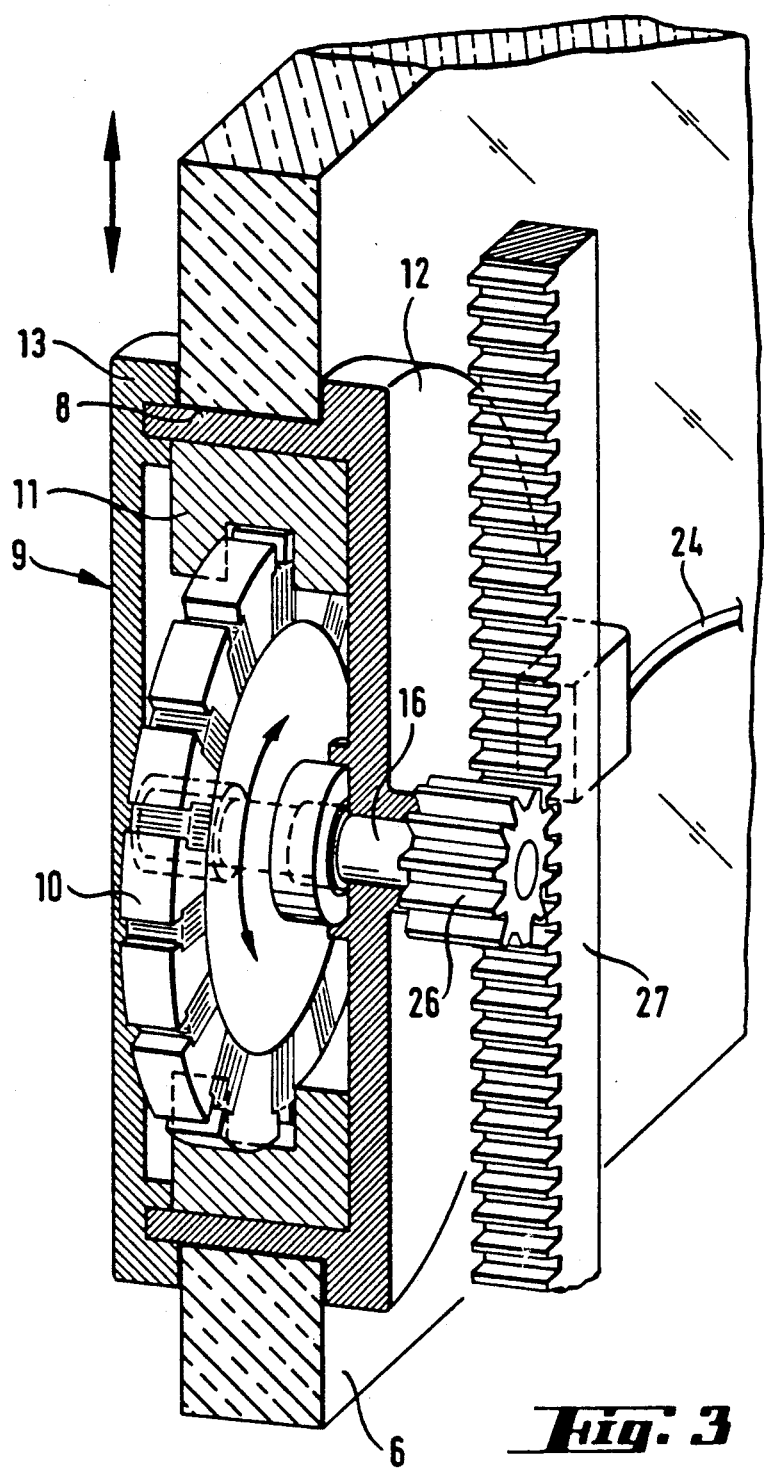
FIG. 3 is an enlarged detail, in partial cross-section, of a second drive system.

The embodiment of the drive for the pane 6 shown in FIG. 3 again comprises an electric motor 9 having a casing in two parts 12 and 13 tightened onto one another, a disc-shaped rotor 10 and a stator 11 and a shaft 16. In this embodiment, shaft 16 is attached to pinion 26 which cooperates with a toothed rack 27, itself fixed to the door casing. The motor is supplied with electricity by a flexible cable 24.

Figure 4:
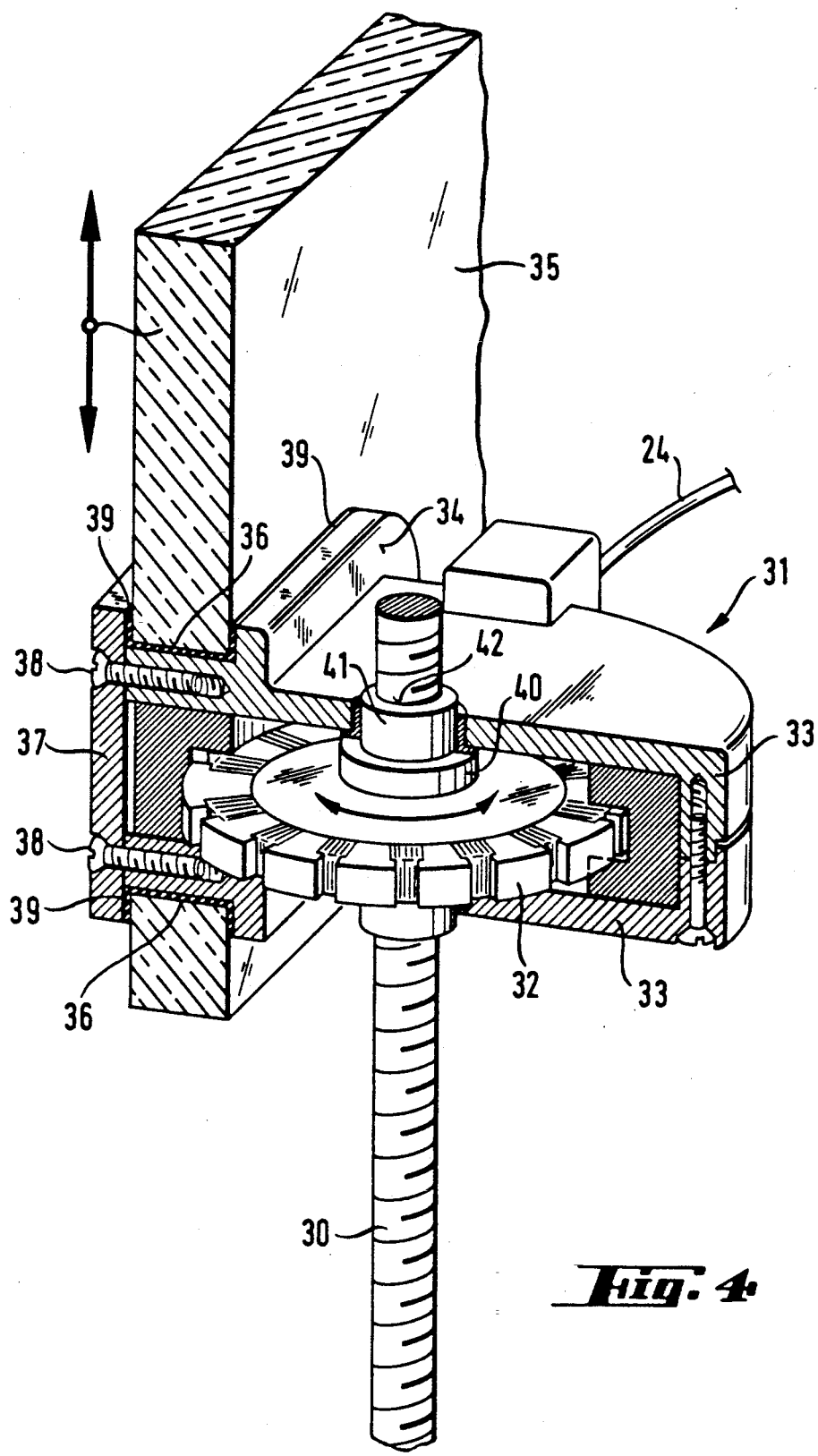
FIG. 4 is an enlarged detail, in partial cross-section, of a third drive system.

The form of embodiment of FIG. 4 has the advantage of not requiring any gear to connect the threaded shaft 30 and the motor 31. In this embodiment, the rotor 32 of the motor itself cooperates directly with the shaft. The motor 31 is designed in such a way that its rotor revolves in a horizontal plane, its axis coinciding with that of the shaft 30. Motor casing 33 is attached, at its side, to a flange 34, which bears against the pane 35. A portion of the casing projects outward and penetrates through the opening 36 in the pane. Plate 37, secured by screws 38, is used to compress flange 34 against the pane and thereby hold the motor securely in place. An elastic seal 39 is interposed between the portion of plate 37 and flange 34 which contact the pane. The hub 40 of the rotor 32 bears against the casing by bearings 41, while its internal threaded surface 42 acts as a nut on the shaft 30.

Figure 5:
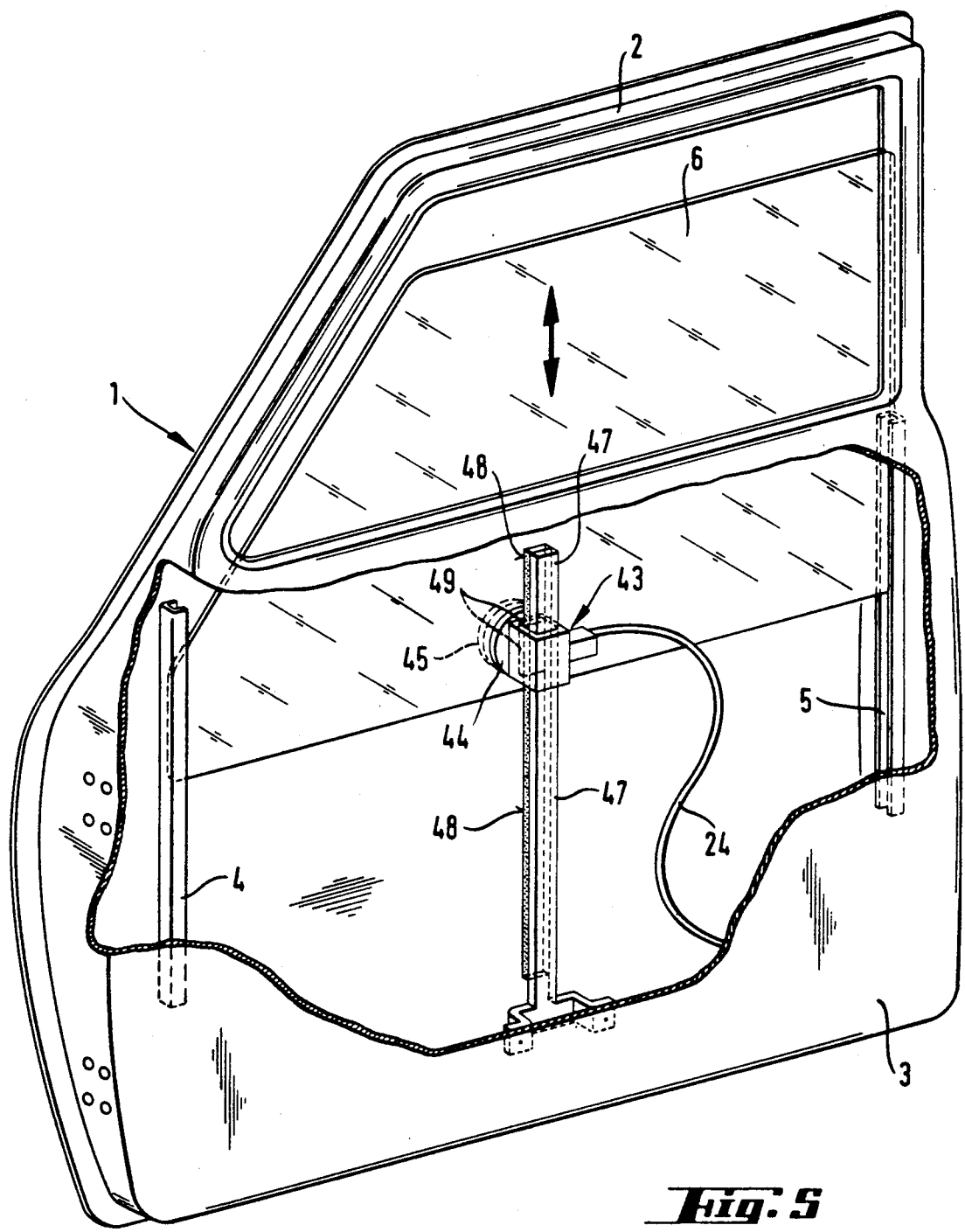
FIG. 5 is an enlarged detail, in partial cross-section, of a fourth drive system.

The embodiment or FIG. 5 makes use of a linear motor 43, the casing of which is attached in the same way as motor casing 33 of motor 31 through a flange 44 and a counterplate 45 in the aperture of the pane 46. The casing is slidably mounted on a rail 47 bearing a copper plate 48. The inductor 49 of the motor cooperates with this plate 48 to move the motor, together with the pane up or down along rail 47 when current is supplied through cable 24.

As will be apparent to those skilled in the art, numerous variations may be made in the practice of the invention. In particular, all manner of techniques may be used to mount the revolving disk motor to the window pane. Furthermore, various alternative methods may be used to transmit the motor force to the transmission means.

We claim:

1. A motor driven vehicle window assembly comprising:
  a transparent pane having an outer periphery mounted and adapted for vertical sliding motion in a window frame;
  an aperture in said transparent pane at a location spaced from the outer periphery thereof;
  electric motor drive means mounted at least partially within said aperture in the transparent pane to reduce the overall space requirements for the drive means; and
  transmission means mounted within the vehicle wall and operatively associated with the drive means for causing the transparent pane to be raised or lowered in the window frame when the drive means is energized.

2. The motor driven vehicle window assembly of claim 1 wherein the electric motor drive means comprises a revolving disc type motor having a flat, disc-shaped rotor.

3. A motor driven vehicle window assembly comprising:
  a transparent pane, having an outer periphery, mounted and adapted for vertical sliding motion in a window frame;
  a single aperture in said transparent pane at a location spaced from the outer periphery thereof;
  electric motor drive means mounted within said aperture in the transparent pane to reduce the overall space requirements for the drive means, said drive means having a drive output means extending out of said aperture on one side of said transparent pane;
  electric means connected to said drive means for energizing said drive means; and
  transmission means mounted within the vehicle wall and operatively associated with the drive means and drivingly connected to said drive output means for causing the transparent pane to be raised or lowered in the window frame when the drive means is erergized, wherein the electric motor drive means comprises a revolving disc type motor having a flat, disc-shaped rotor positioned for rotation within said aperture in the plane of said transparent pane and wherein the drive output means includes gear means mounted for rotation about an axis extending at a right angle to said plane for engaging said transmission means.

4. The window assembly of claim 3 wherein the drive means includes first and second casing section engaging opposite sides of said pane aperture for mounting the drive means in the aperture, and the gear means is mounted at the end of a shaft connected to the rotor and passing through the center thereof.

5. The window assembly of claim 4 wherein the gear means includes a bevel gear and the transmission means includes a substantially vertical threaded shaft and a bevel gear wheel assembly comprising a nut having internal threads for engaging the threaded shaft.

6. The window assembly of claim 5 wherein the first casing of the drive means includes a flange extending therefrom, the flange including a casing aperture for allowing passage of the threaded shaft therethrough, and wherein the bevel gear wheel assembly includes a bevel gear wheel mounted on one side of the flange and the nut mounted on the other side of the flange about the casing aperture therein.

7. The window assembly of claim 4 wherein the transmission means includes a rack mechanism and the gear means includes a sprocket for engaging the track mechanism.

8. The window assembly of claim 2 wherein the rotor is positioned for rotation in a plane substantially perpendicular to the plane of the pane and the transmission means comprises a threaded shaft mounted substantially parallel to the plane of the pane.

9. The window assembly of claim 8 wherein the transmission means comprises an internal threaded surface in the hub of the rotor which engages the threaded shaft.

10. A motor driven vehicle window assembly comprising:
  a transparent pane, having an outer periphery, mounted and adapted for vertical sliding motion in a window frame;
  a single aperture in said transparent pane at a location spaced from the outer periphery thereof;
  electric motor drive means comprising a linear motor mounted within said aperture in in the transparent pane to reduce the overall space requirements for the drive means, said drive means having a drive output means extending out of said aperture on one side of said transparent pane;
  electric means connected to said drive means for energizing said drive means; and transmission means comprising a conductor rail mounted within the vehicle wall and operatively associated with the drive means and drivingly connected to said drive output means for causing the transparent pane to be raised or lowered in the window frame when the drive means is energized.

11. A motor driven vehicle window assembly comprising:
- a transparent pane, having an outer periphery, mounted and adapted for vertical sliding motion in a window frame;
- a single aperture in said transparent pane at a location spaced from the outer periphery thereof;
- electric motor drive means mounted within said aperture in the transparent pane to reduce the overall space requirements for the drive means, said drive means having a drive output means extending out of said aperture on one side of said transparent pane;
- electric means connected to said drive means for energizing said drive means; and
- transmission means mounted within the vehicle wall and operatively associated with the drive means and drivingly connected to said drive output means for causing the transparent pane to be raised or lowered in the window frame when the drive means is erergized.

12. A motor driven vehicle window assembly comprising:
- a transparent pane, having an outer periphery, mounted and adapted for vertical sliding motion in a window frame;
- an aperture in said transparent pane, said aperture having a predetermined size and shape;
- electric motor drive means mounted within said aperture in the transparent pane to reduce the overall space requirements for the drive means, said drive means having an outer size and shape, as measured in the plane of said transparent pane, which is complimentary to said predetermined size and shape and engaging at least a portion of the periphery of said aperture to prevent movement of said drive means in the plane of said transparent pane, said drive means further having a drive output means extending out of said aperture on one side of said transparent pane;
- electric means connected to said drive means for energizing said drive means; and
- transmission means mounted within the vehicle wall and operatively associated with the drive means and drivingly connected to said drive output means for causing the transparent pane to be raised or lowered in the window frame when the drive means is energized.

13. A motor driven vehicle window assembly comprising:
- a transparent pane having an outer periphery mounted and adapted for vertical sliding motion in a window frame;
- an electric motor drive means having a predetermined cross-sectional size, as measured through a section thereof;
- an aperture in said transparent pane at a location spaced from the outer periphery thereof, said aperture having a size at least as large as said cross-sectional size of said drive means;
- said electric motor drive means being mounted and positioned at least partially within said aperture in the transparent pane with said section extending across said aperture, to reduce the overall space requirements for the drive means; and
- transmission means mounted within the vehicle wall and operatively associated with the drive means for causing the transparent pane to be raised or lowered in the window frame when the drive means is energized.

* * * * *